(12) United States Patent
Yoon et al.

(10) Patent No.: US 8,760,502 B2
(45) Date of Patent: Jun. 24, 2014

(54) METHOD FOR IMPROVING 3 DIMENSIONAL EFFECT AND REDUCING VISUAL FATIGUE AND APPARATUS ENABLING THE SAME

(75) Inventors: Kuk-jin Yoon, Gwangju (KR); Makoto Kimura, Yokohama (JP); Jin-kyung Lee, Suwon-si (KR); Yasuo Takane, Yokohama (JP); Tae-kyung Kim, Seoul (KR); Hyun-seok Choi, Seoul (KR); Taek-seong Jeong, Suwon-si (KR); Kyoung-hwan Moon, Yongin-si (KR); Takashima Masahiro, Suwon-si (KR)

(73) Assignees: Samsung Electronics Co., Ltd. (KR); Gwangju Institute of Science and Technology (KR)

( * ) Notice: Subject to any disclaimer, the term of this patent is extended or adjusted under 35 U.S.C. 154(b) by 318 days.

(21) Appl. No.: 13/242,586

(22) Filed: Sep. 23, 2011

(65) Prior Publication Data
US 2012/0120202 A1    May 17, 2012

(30) Foreign Application Priority Data
Nov. 12, 2010  (KR) .................. 10-2010-0112687

(51) Int. Cl.
*H04N 13/02*    (2006.01)
(52) U.S. Cl.
USPC ................... 348/49; 348/E13.074
(58) Field of Classification Search
CPC ............. H04N 13/0022; H04N 13/02; H04N 2013/0081
USPC ........................................................ 348/49
See application file for complete search history.

(56) References Cited

U.S. PATENT DOCUMENTS

| | | | | |
|---|---|---|---|---|
| 5,157,484 | A * | 10/1992 | Pritchard et al. | 348/50 |
| 5,325,193 | A * | 6/1994 | Pritchard et al. | 348/50 |
| 5,451,976 | A * | 9/1995 | Ito | 345/8 |
| 5,561,537 | A * | 10/1996 | Aritake et al. | 359/23 |
| 5,627,582 | A * | 5/1997 | Muramoto et al. | 348/43 |
| 7,944,444 | B2 * | 5/2011 | Ha et al. | 345/427 |
| 8,019,146 | B2 * | 9/2011 | Koo et al. | 382/154 |
| 8,116,557 | B2 * | 2/2012 | Ha et al. | 382/154 |
| 8,390,674 | B2 * | 3/2013 | Kim et al. | 348/42 |
| 2002/0191082 | A1* | 12/2002 | Fujino et al. | 348/211.14 |
| 2004/0228521 | A1* | 11/2004 | Jeong et al. | 382/154 |
| 2006/0028543 | A1* | 2/2006 | Sohn et al. | 348/42 |
| 2006/0158730 | A1* | 7/2006 | Kira | 359/462 |
| 2007/0047040 | A1* | 3/2007 | Ha | 359/24 |
| 2007/0052794 | A1* | 3/2007 | Ha et al. | 348/42 |
| 2007/0081716 | A1* | 4/2007 | Ha et al. | 382/154 |

(Continued)

*Primary Examiner* — Christopher S Kelley
*Assistant Examiner* — Deirdre Beasley
(74) *Attorney, Agent, or Firm* — The Farrell Law Firm, P.C.

(57) ABSTRACT

A method and an apparatus for improving three dimensional (3D) effect of a 3D image collected by a 3D photographing apparatus, and reducing visual fatigue, are provided. A feature point of a left-eye image entering through a left-eye lens and of a right-eye image entering through a right-eye lens is acquired, a disparity between the left- and right-eye images is detected, a distance between the left- and right-eye lenses is controlled so that the disparity between the left- and right-eye images becomes a previously-set reference disparity, and at least one of the left- and right-eye images is shifted so that a convergence point is placed on an object located within the left- and right-eye images.

17 Claims, 10 Drawing Sheets

(56) References Cited

U.S. PATENT DOCUMENTS

| | | | |
|---|---|---|---|
| 2007/0081814 A1* | 4/2007 | Ha et al. | 396/310 |
| 2007/0120972 A1* | 5/2007 | Kim et al. | 348/51 |
| 2008/0112616 A1* | 5/2008 | Koo et al. | 382/171 |
| 2008/0131107 A1* | 6/2008 | Ueno | 396/50 |
| 2008/0199070 A1* | 8/2008 | Kim et al. | 382/154 |
| 2009/0041338 A1* | 2/2009 | Sawachi | 382/154 |
| 2009/0096863 A1* | 4/2009 | Kim et al. | 348/42 |
| 2009/0144792 A1* | 6/2009 | Fielibert et al. | 725/116 |
| 2010/0039502 A1* | 2/2010 | Robinson | 348/47 |
| 2010/0039504 A1* | 2/2010 | Takahashi et al. | 348/54 |
| 2010/0128974 A1* | 5/2010 | Koizumi et al. | 382/154 |
| 2010/0201783 A1* | 8/2010 | Ueda et al. | 348/46 |
| 2010/0208117 A1* | 8/2010 | Shintani | 348/311 |
| 2011/0109731 A1* | 5/2011 | Koo et al. | 348/51 |

\* cited by examiner

US 8,760,502 B2

METHOD FOR IMPROVING 3 DIMENSIONAL EFFECT AND REDUCING VISUAL FATIGUE AND APPARATUS ENABLING THE SAME

PRIORITY

This application claims priority under 35 U.S.C. §119(a) to Korean Patent Application No. 10-2010-0112687, filed on Nov. 12, 2010 in the Korean Intellectual Property Office, the contents of which are incorporated herein by reference.

BACKGROUND OF THE INVENTION

1. Field of the Invention

The present invention relates generally to three dimensional (3D) photographing, and more particularly, to a method for improving the 3D effect of a 3D image collected by a 3D photographing apparatus and reducing visual fatigue for viewing the 3D image, and an apparatus enabling the same.

2. Description of the Related Art

The 3D imaging technology can be used in a variety of applications including, but not limited to, information and communication, broadcasting, medical science, education, training, military, games, animation, virtual reality, Computer-Aided Design (CAD), and industrial technology.

A person may perceive depth based on varying eye lens thicknesses according to location of a target object, difference of angle between two eyes with respect to the target object, difference of location and shape of the object viewed by the left and right eyes, disparity occurred due to movement of the object, and other mental or memory effects.

The binocular disparity, which is a result of a person's eyes being horizontally about 6 to 7 cm apart from each other, contributes to the depth perception. A person viewing an object actually sees it at different angles due to binocular disparity, so the images entering the two eyes are in different forms, and when these images are delivered to the brain, the brain accurately fuses the two pieces of information to thus create the original 3D effect.

In order to acquire a 3D image, a 3D camera can be used, which acquires a left-eye image and a right-eye image of one single object through two optical lens systems.

In view of the above, the difference between the acquired left- and right-eye images plays an important role in constructing a 3D image. That is, an excessively long distance between left- and right-eye images will create an excessively deep 3D photo or video effect, thereby causing dizziness to the viewer.

Conversely, too short of a distance between left- and right-eye images creates a compromised 3D effect, which fail to give the viewer the correct 3D image.

SUMMARY OF THE INVENTION

Embodiments of the present invention are directed to overcoming the above and other disadvantages of the prior art.

According to the present invention, provided is a method for improving the 3D effect of a 3D image collected by a 3D photographing apparatus and reducing visual fatigue for viewing the 3D image, and an apparatus enabling the same.

A method of the present invention includes acquiring a feature point of a left-eye image entering through a left-eye lens, and of a right-eye image entering through a right-eye lens, detecting a disparity between the left- and right-eye images by comparing the feature points of the left- and right-eye images, controlling a distance between the left- and right-eye lenses so that the disparity between the left- and right-eye images becomes a previously-set reference disparity, and shifting at least one of the left- and right-eye images so that a convergence point is placed on a specific object located within the left- and right-eye images.

Methods and the apparatus of the present invention may be realized by a computer-readable recording medium on which a program to execute the method according to one of the above methods is written.

According to the present invention, images with less visual fatigue and greater 3D effect can be acquired by controlling a distance between the left- and right-eye lenses and utilizing convergence.

Further, a more naturally appealing 3D effect can be provided by matching a convergence point on a specific object in association with AutoFocus (AF) or facial recognition.

BRIEF DESCRIPTION OF THE DRAWINGS

The above and/or other aspects of the present invention will be more apparent by describing certain embodiments of the present invention with reference to the accompanying drawings, in which.

DETAILED DESCRIPTION OF EMBODIMENTS OF THE INVENTION

Figure 1:
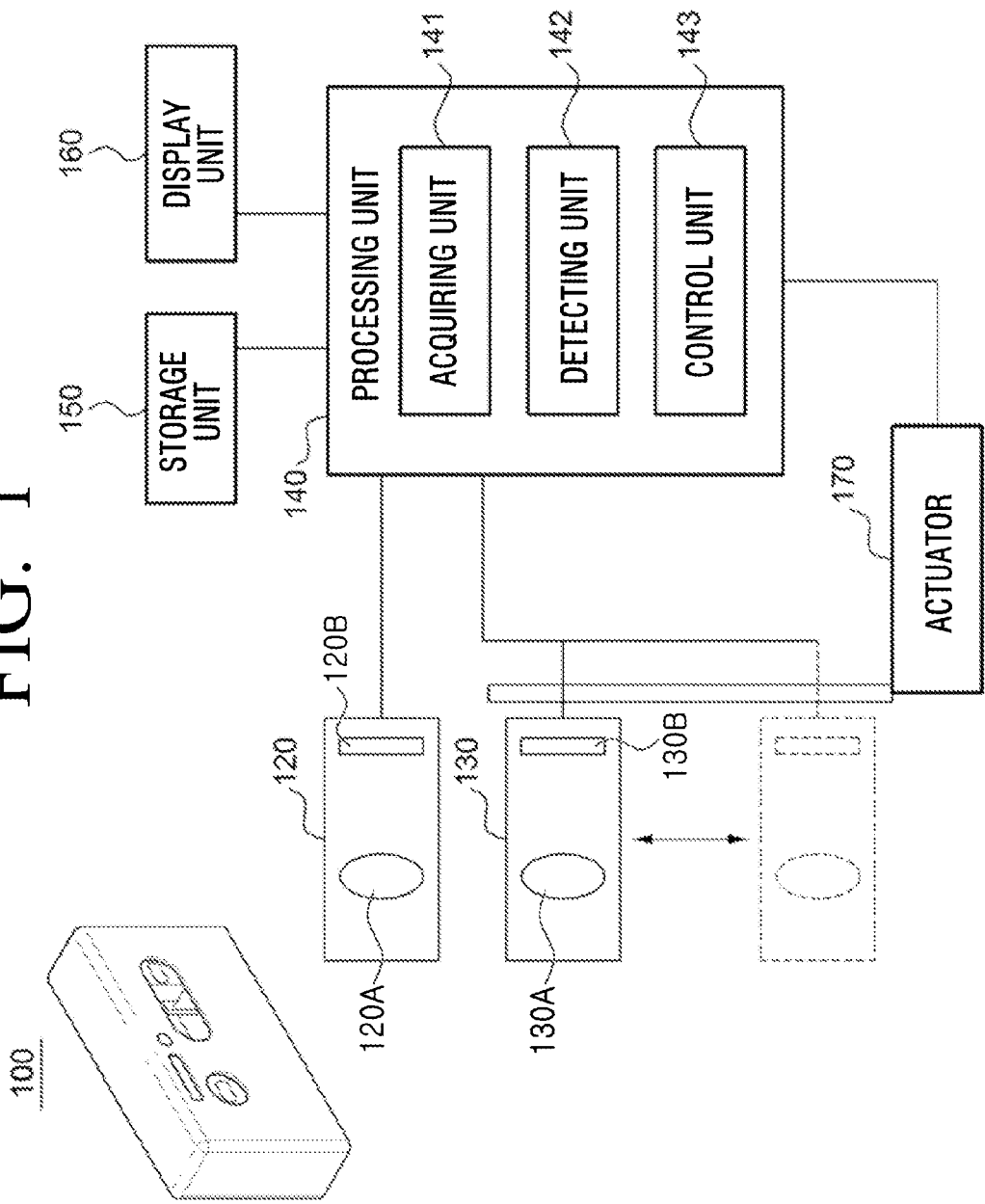
FIG. 1 illustrates a 3D photographing apparatus according to the present invention.

Embodiments of the present invention will be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. Throughout the drawings, the same drawing reference numerals will be understood to refer to the same elements, features and structures. In addition, descriptions of well-known functions and constructions are omitted for the sake of clarity and conciseness. FIG. 1 illustrates a 3D photographing apparatus 100 according to the present invention.

Referring to FIG. 1, the 3D photographing apparatus 100 includes a left-eye lens unit 120, a right-eye lens unit 130, a processing unit 140, a storage unit 150, a display unit 160, and an actuator unit 170.

The left-eye lens unit 120 includes a plurality of lenses that may be used to acquire a left-eye image, and to operate as zoom lenses. The left-eye lens unit 120 includes a left-eye lens. The light entering the left-eye lens passes a sensor (not illustrated), and is processed at the processing unit 140 to be generated as an image of an object. The generated image is called a 'left-eye image'.

The right-eye lens unit 130 includes a plurality of lenses that may be used to acquire a right-eye image, and to operate as zoom lenses. The right-eye lens unit 130 includes a right-eye lens. The light entering the right-eye lens passes a sensor (not illustrated), and is processed at the processing unit 140 to be generated as an image of an object. The generated image is called a 'right-eye image'.

At least one of the left- and right-eye lens units 120, 130 is moveable, so that a distance between the left- and right-eye lens units 120, 130 can be increased or decreased. That is, at least one of the left- and right-eye lens units 120, 130 can be moved in a perpendicular direction with respect to an optical axis, thereby either increasing or decreasing the distance between the left- and right-eye lens units 120, 130.

The 'perpendicular direction with respect to an optical axis' herein may encompass both the absolute and substantial perpendicularities. For example, it is considered that the left- or right-eye lens unit 120, 130 moves in substantially perpendicular direction if the same moves at a slightly inclined state at an angle of 0-±5 degrees.

Although the left-eye lens unit 120 includes the left-eye lens and the right-eye lens unit 130 includes the right-eye lens as explained above, the left-eye lens unit 120 may include a right-eye lens and the right-eye lens unit 130 may include a left-eye lens.

The processing unit 140 includes an acquiring unit 141, a detecting unit 142, and a control unit 143.

The acquiring unit 141 acquires the feature point of the left-eye image entering through the left-eye lens and the feature point of the right-eye image entering through the right-eye lens.

The 'feature point' herein refers to a point on the left- or right-eye image to check a matching point between the left- and right-eye images.

The detecting unit 142 compares the feature points of the left- and right-eye images to detect a disparity therebetween.

The 'disparity' refers to a degree of misalignment between the left- and right-eye images.

The control unit 143 controls a distance between the left- and right-eye lenses so that the disparity between the left- and right-eye images corresponds to a reference disparity, and shifts at least one of the left- and right-eye images so that a convergence point is placed on an object on the left- and right-eye images.

The 'convergence point' herein refers to a point at which there is a minimum disparity between the feature point existing on the left-eye image and the feature point existing on the right-eye image with respect to the object.

The storage unit 150 stores the left-eye image, the right-eye image, the reference disparity, the feature point, the convergence point, and other information.

The display unit 160 displays both the left- and right-eye images, and accordingly, displays a 3D image therethrough.

The display unit 160 displays at least one of the left- and right-eye images, and accordingly, displays at least a two-dimensional (2D) image therethrough. The display unit 160 displays an indicator of visual fatigue that a viewer of the 3D image may have due to the disparity. The display unit 160 may also display a suggestion to adjust the disparity depending on the degree of visual fatigue provided by the indicator.

The actuator unit 170 may be implemented on at least one of the left-eye lens unit 120 and the right-eye lens unit 130, and at least one of the left- and right-eye lens units 120, 130 may be controlled to move in a perpendicular direction with respect to the optical axis.

Referring to FIG. 1, the left- and right-eye lens units 120, 130 each include a lens and a sensor, and at least one of the left- and right-eye lens units 120, 130 is moved by the actuator 170.

Other embodiments than that illustrated in FIG. 1 may be implemented. For example, in a camera that has the sensor and the lens separated from each other, the sensor may be in a fixed location, while the lens is moveably provided. Further, in another embodiment, two lenses may be temporally-spatially divided and share one sensor.

The actuator 170 may move one or both of the left- and right-eye lens units 120, 130.

The left-eye lens unit 120 or the right-eye lens unit 130 may be moved when these 120, 130 are parallel to the optical axis. However, the left-eye lens unit 120 or the right-eye lens unit 130 may be moved in the same manner even when these units are not parallel to the optical axis.

At least one of the left- and right-eye lens units 120, 130 may move along the guide shaft. If the guide shaft is almost perpendicular to the optical axis, at least one of the left- and right-eye lens units 120, 130 is moved perpendicularly to the optical axis. If the guide shaft has a curved shape, at least one of the left- and right-eye lens units 120, 130 may be moved in a curved direction.

The images outputted from the left- and right-eye lens units 120, 130 are processed at the processing unit 140, and a signal acquired from the processed images may control the actuator 170.

The images, which are acquired through controlling on the actuator 170, may be outputted through the display unit 160 or stored at the storage unit 150.

The operation of acquiring and processing an image using the 3D photographing apparatus 100 will be explained below with reference to FIG. 2, which illustrates left- and right-eye lenses of the 3D photographing apparatus, according to the present invention.

Figure 2:
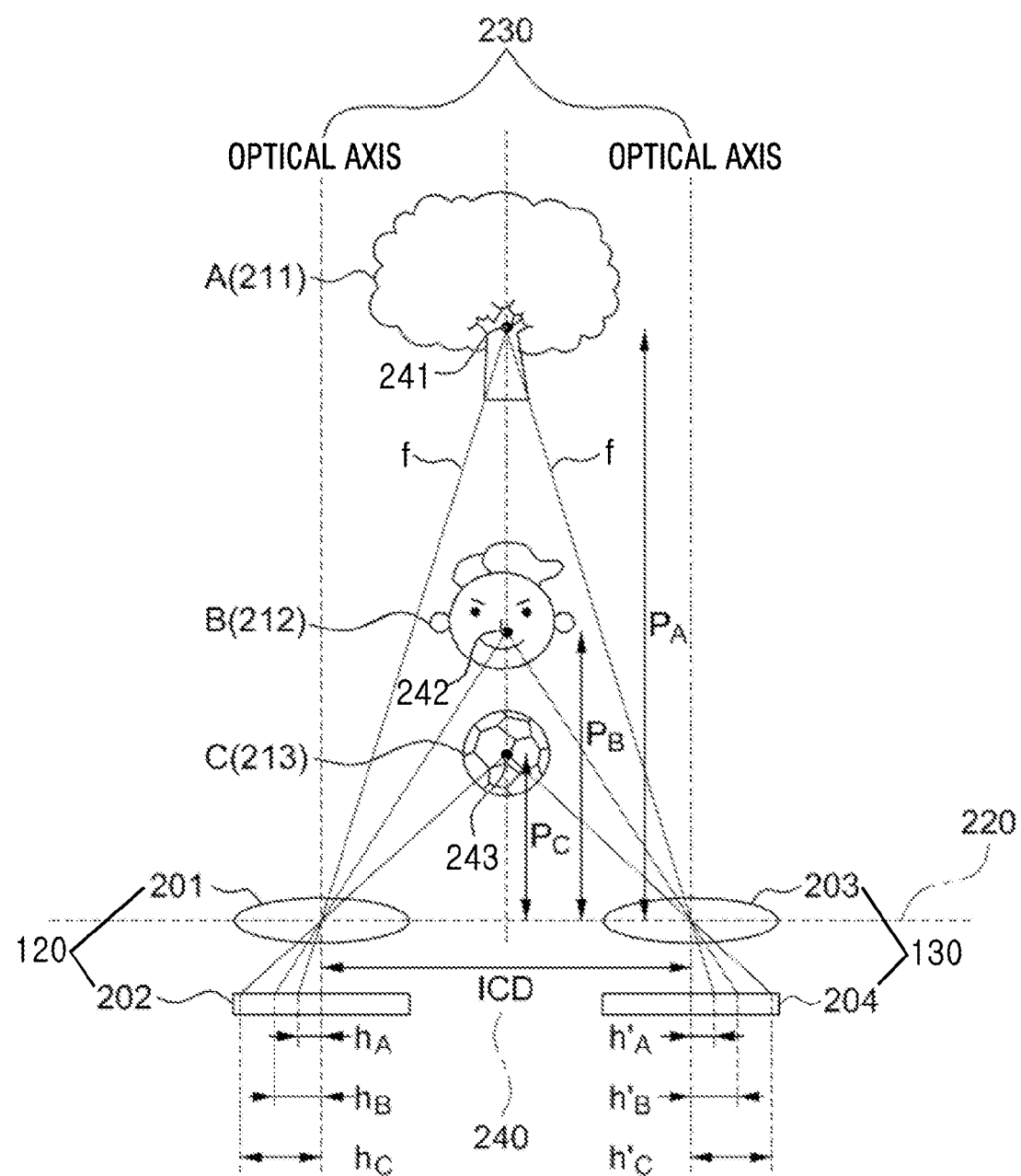
FIG. 2 illustrates a left-eye lens and a right-eye lens of a 3D photographing apparatus according to the present invention.

Referring to FIG. 2, the left-eye lens unit 120 including the left-eye lens 201 and the left-eye sensor 202, and the right-eye lens unit 130 including the right-eye lens 203 and the right-eye sensor 204 are at a distance from each other.

The distance between the left- and right-eye lens units 120, 130 is the Inter Camera Distance (ICD) or baseline 240.

The left-eye sensor 202 operates to collect the left-eye images entering through the left-eye lens 201, which images collected are processed at the processing unit 140.

The right-eye sensor 204 operates to collect the right-eye images entering through the right-eye lens 203, which images are processed at the processing unit 140.

In real-time basis, the left- and right-eye images are delivered to the processing unit 140, and the left- and right-eye images processed at the processing unit 140 appear on the display also in real-time basis.

The actuator 170 may control the movement of the left-eye lens unit 120 or of the right-eye lens unit 130. The 3D photographing apparatus 100 may photograph the left- and right-eye images either during movement or after completion of movement of the left- or right-eye lens unit 120, 130.

The processing unit 140 adjusts ICD 240 by controlling the actuator 170, to collect the left- and right-eye images with less visual fatigue and better 3D effect based on the adjusted ICD 240.

A still image is photographed at the adjusted ICD 240, which may be fixed in a video photographing. The actuator may be adjusted in real-time according to scene change to change the ICD 240.

Information about the ICD 240 may be displayed on the display.

The user may adjust the ICD 240 at the 3D photographing apparatus 100 either automatically or manually.

Referring back to FIG. 1, the processing unit 140 may process in a manner such that the color, Auto Exposure (AE), Auto White Balance (AWB) or geometric difference of the left- and right-eye images is minimized to construct a natural 3D image based on the left- and right-eye images.

The processing unit 140 may calculate the maximum disparity, minimum disparity, or disparity or feature point of a specific object of the left- and right-eye images, and therefore, process the 3D image to have less visual fatigue and improved 3D effect.

If the 3D photographing apparatus 100 having the left- and right-eye lens units 120, 130 has differences in lenses and sensors, the images may not align. In this case, it is necessary to align one image to other image using signal processing.

The feature points of the left- and right-eye images may diverge from each other due to geometric differences such as difference of lenses or sensors of the left- and right-eye lens units 120, 130.

Further, the left- and right-eye images may have different sizes due to different zooms at the left and right-eye lens units 120, 130.

The geometric differences rarely occur in the 2D photographing apparatus, but frequently occur in the 3D photographing apparatus.

Fewer geometric differences lead to more images with less visual fatigue and better 3D effect. The processing unit 140 may minimize the geometric differences using the shift, crop, resize, and affine transformation between the left- and right-eye images.

The left- and right-eye lens units 120, 130 of the 3D photographing apparatus 100 play similar roles as those of the human eyes. The images converged on the left or right eye of a person are synthesized to provide a 3D effect that the person may perceive. Similarly, the 3D photographing apparatus 100 may include the left- and right-eye lens units 120, 130 corresponding to the person's left or right eye, to thus collect the left-eye images through the left-eye lens unit 120 and collect the right-eye images through the right-eye lens unit 130.

The collected left- and right-eye images may be displayed on the display unit 160 in various manners. Principally, the images corresponding to the right eye of a person are exposed exclusively to the right eye of the person, while the images corresponding to the left eye are exposed exclusively to the left eye of the person. Accordingly, the left- and right-eye images are synthesized in the person's brain, to thus provide an illusion of depth by which the person feels as if he/she is watching a 3D image upon seeing the synthesized left- and right-eye images.

The disparity (or parallax) is one of the reasons that cause the person to perceive the depth from the left- and right-eye images.

The viewer would have a difference of view-point due to different locations of the left- and right-eye lens units 120, 130, i.e., due to spatial dislocation of the left- and right-eye lens units 120, 130.

That is, referring again to FIG. 2, the same image of one object is converged on the left- and right-eye lens sensors 202, 204 at different locations. An object a long distance away generally has lower disparity, while the object a short distance away generally has higher disparity. The processing unit 140 calculates the disparity information to thus provide a 3D image with less visual fatigue and better 3D effect.

The 3D photographing apparatus 100 may include the left-eye lens 201 and the left-eye lens sensor 202, or the right-eye lens 203 or the right-eye lens sensor 204.

Referring to FIGS. 1 and 2, the 3D photographing apparatus 100 may use one of the left- and right-eye lenses 201, 203, along with the two sensors, i.e., left- and right-eye sensors 202, 204.

The 3D photographing apparatus 100 may use one of the left- and right-eye lenses 201, 203 and one of the left- and right-eye sensors 202, 204 as a common lens and sensor.

Along with the disparity, convergence is also an important reason that causes depth perception.

The 'convergence' refers to the left- and right-eye lenses 202, 203 focusing on the object within the 3D image.

When convergence is on the object, the point of the object is the convergence point, and an angle between the left- and right-eye lenses 202, 203 is the convergence angle.

The convergence point is where the disparity is minimal, and with reference to the 3D image by the 3D photographing apparatus 100, this refers to a location of the object at which the left- and right-eye lenses 201, 202 are focused.

The 'convergence angle' is an angle between the left- and right-eye lenses that decreases as an object moves farther away, while the angle increases as the object moves closer.

The processing unit 160 processes the distance to the object by calculating the angle information, and thus is able to calculate the perceived depth of the object.

As the disparity between left- and right-eye images of the object is minimized, the 3D image of the object has less visual fatigue and better 3D effect. If the object is the convergence point, the disparity of the object is 0, and the object is displayed at a location on the display.

In order to create depth perception by synthesizing the left- and right-eye images, the disparity between the left- and right-eye images has to be within a limit so as to be within a synthesizable range. That is, too high a disparity will cause an image to have plural overlain images, which will cause dizziness to the viewer, while too low a disparity will compromise 3D effect.

Accordingly, an appropriate moderate disparity has to be maintained in order to obtain a 3D image with optimum 3D effect.

Referring to FIG. 2, object-A 211, object-B 212, and object-C 210 are at distances PA, PB, and PC from the lens surface 220 respectively, and the focal distance between the left- and right-eye lenses 201, 203 is same as f.

The disparities dA, dB, dC of object-A 211, object-B 212 and object-C 212 may be expressed by the following set of equations which will be called Equation (1):

$$dA = hA + h'A = F \cdot ICD/PA$$

$$dB = hB + h'B = F \cdot ICD/PB$$

$$dC = hC + h'C = F \cdot ICD/PC \qquad (1)$$

where, hA denotes a distance of an image of object-A 211 diverging from the optical axis passing a center of the left-eye lens 201, measured when the image of object-A 211 is converged on the left-eye sensor 202 after passing through the center of the left-eye lens 201, h'A denotes a distance of an image of object-A 211 diverging from the optical axis passing a center of the right-eye lens 203, measured when the image of object-A 211 is converged on the right-eye sensor 204 after passing through the center of the right-eye lens 203, hB denotes a distance of an image of object-B 212 diverging from the optical axis passing a center of the left-eye lens 201, measured when the image of object-B 212 is converged on the left-eye sensor 202 after passing through the center of the left-eye lens 201, h'B denotes a distance of an image of object-B 212 diverging from the optical axis passing a center of the right-eye lens 203, measured when the image of object-B 212 is converged on the right-eye sensor 204 after passing through the center of the right-eye lens 203, hC denotes a distance of an image of object-C 213 diverging from the optical axis passing a center of the left-eye lens 201, measured when the image of object-C 213 is converged on the left-eye sensor 202 after passing through the center of the left-eye lens 201, h'C denotes a distance of an image of object-B 212 diverging from the optical axis passing a center of the right-eye lens 203, measured when the image of object-C 212 is converged on the right-eye sensor 204 after passing through the center of the right-eye lens 203.

From Equation (1), it is clear that the disparity dC of the object-C 213 moves toward 0 as the distance PC of object-C 213 moves toward infinity, and the disparity of an object existing in infinity moves closer to 0.

Conversely, the disparity increases as the distance PC of object-C 213 moves closer to the lens surface 230.

As Equation (1) demonstrates, the disparity is in proportion to the focal distance of the camera and ICD 240. Accordingly, in order to increase the disparity, the ICD 240 is increased, while the ICD 240 is decreased to decrease the disparity.

In order to acquire a 3D image that gives less visual fatigue to the viewer, disparities dA, dB and dC have to be maintained below a specific limit.

The limit of the disparity may vary depending on individuals. That is, some viewers perceive 3D images even at somewhat high disparity without experiencing too much trouble, while the others incur dizziness even with small disparities. That is, the disparity limit depends significantly on the individual's personal tendencies. Further, the disparity limit may also vary depending on display conditions, even when the left- and right-eye images are photographed at the same disparity.

The disparity limit may be set, for example, between for 30 and 40 minutes.

The disparity limit of 35 minutes refers to an angle between the left- and right-eye lenses 201, 203, when the left- and right-eye lenses 201, 203 are converged on the display. In this example, 35 minutes are 0.5833 degrees (=35/60) when expressed by angle.

For example, with respect to a 16:9 Full (HD) display, the disparity limit of 35 minutes are 35 pixels in an example in which a distance between the display and the viewer is 2 m, the display size is 50 inches, the horizontal length is 1.107 m, and the distance between the left- and right-eye lenses is 6.5 cm.

The 35 pixels correspond to a distance by which the left- and right-eye images are diverged from each other on the display.

The 3D photographing apparatus 100 may set the disparity limit based on a preset initial value or the viewer may adjust the disparity limit in consideration of the display size.

If the viewer does not experience fatigue from the 3D image at or around the disparity limit, the optimum 3D effect of the 3D image can be ensured.

Accordingly, the disparity limit may be adjusted, considering visual fatigue and 3D effect of the 3D image.

The 3D effect is created if the convergence and accommodation are adjusted with respect to the object viewed by the 3D image.

The 'convergence' is shifting at least one of the left- and right-eye images to match the disparity of the object close to 0. If the disparity about the object is 0, that indicates that the object is on the display.

The 'accommodation' refers to focusing the left- and right-eye lenses 201, 203 on the object by using AF of the lens.

During or after photographing a 3D image, the processing unit 140 may process so that a central portion of the 3D image, a central portion of a person by facial recognition, an object existing on an AF area, or an object image can be the convergence point.

It is possible to shift at least one of the left- and right-eye images so that a farthest or nearest spot on an image, or a spot inputted by the viewer can be the convergence point.

At least one of the left- and right-eye images may be shifted to cause the disparity existing between the left- and right-eye images to be 0, and a spot at which the disparity becomes 0 is the convergence point.

Referring to FIG. 2, if the convergence point is aligned on the object-B 242, the object-A 241 has a negative disparity d'A, while the object-C 243 has a positive disparity d'C.

Since the disparities dA, dB, dC after convergence adjustment are different from the disparities d'A, d'B, d'C after the convergence adjustment, the perceived depth may vary.

It is possible to maintain d'A, d'B, d'C below the disparity limit based on the convergence adjustment. In consideration of the 3D effect and visual fatigue, d'A, d'B, d'C have to be adjusted to be as close to the disparity limit as possible.

If the convergence point is aligned on the object-B 242, Equation (1) can be expressed by the following set of expressions, which will be called Equation 2):

$$d'A = dA - dB = f \cdot ICD \cdot (1/PA - 1/PB) < 0$$

$$d'B = 0$$

$$d'C = dC - dB = f \cdot ICD \cdot (1/PC - 1/PB) < 0 \quad (2)$$

If the convergence point based on Equation (2) is aligned on the object-B 242, the object-A 241 has a negative disparity, while the object-C 243 has a positive disparity.

As the convergence point is adjusted, there exists an object with zero, negative and positive disparities. As a result, the 3D effect of the 3D image increases.

In terms of visual fatigue, factors such as display size, distance between display and viewer, ICD, color difference between left- and right-eye images, brightness difference between left- and right-eye images, location of focal points of the left- and right-eye images, size of geometric image, misalignment of feature points of left- and right-eye lens units, shifting of feature points of left- and right-eye images, and distortion can be considered.

Among the above-mentioned factors, vertical misalignment of left- and right-eye images, i.e., the misalignment in perpendicular direction with respect to the same object, mostly influences the visual fatigue.

The disparity value to adjust the perceived depth may be obtained using a focal distance (t) between the left- and right-eye lenses 201, 202, ICD 240, and distances PA, PB, PC between lens surface 230 and the object.

Calculating the minimum and maximum disparity values between left- and right-eye images is a very important technique, particularly in terms of estimating disparity value between left- and right-eye images.

If the left- and right-eye images are overlain on each other, exact matching has to be made with respect to numerous pixels across the left- and right-eye images.

If matching is performed with respect to the pixels of all the left- and right-eye images to calculate the disparity values, the processing time will be excessive to the extent that it would be extremely difficult to implement in the actual system to precisely align the left- and right-eye images.

For real-time 3D image processing, it is necessary to employ a technique to extract a few pixels that are efficient for the matching, and also to estimate the disparity values using the extracted pixels.

Therefore, issues such as which pixels have to be used for the matching (i.e., feature point extracting), how these extracted pixels are precisely matched (i.e., feature point matching), and how a range is determined based on the matching result (i.e., disparity value determination) are considered very important.

The processing unit 140 detects from the inputted left- and right-eye images the feature points of the left- and right-eye images, which are more advantageous for the matching, matches the extracted feature points of the left- and right-eye images, and calculates the reliable disparity values using the matching result.

The technique to extract the feature points from the left- and right-eye images will be explained below.

The ICD 240 is adjusted based on the disparity value, which is calculated in real-time, and the feature points of the left- and right-eye images are calculated based on the optimum ICD 240.

Gradients of x and y axes are calculated from the left- and right-eye images, and the feature points are extracted using the value of the response function based on the calculated gradients. If the gradients are used, the feature points can be extracted within a relatively short time since there are relatively small variations in scale or size of the feature points between left- and right-eye images.

A possible error for calculating the size of the feature point size can be minimized by calculating a feature point based on some points that exceed a threshold, i.e., based on the points at which the absolute values of x-axis variation (dx) and y-axis variation (dy) are at peak.

A corner of the left- and right-eye images, rather than the features such as human clothes that have minimal variation in brightness, may be used for the matching of the feature points. For example, the corner such as a corner of a building at which the brightness considerably varies, may be used.

Although the left- and right-eye images enter the processing unit 140 in full View Graphic Array (VGA), the full images are then converged into ¼ reduced Quarter Video Graphic Array (QVGA) at the processing unit 140. The feature points may be detected using 8×24 pixel block size from the ¼ reduced images. The reason for the 8×24 pixels having different perpendicular and horizontal ratio, is because the search range of matching points that need more accuracy are mostly in the horizontal direction.

If a block size with relatively large horizontal and vertical sizes is used, matching of the feature pints may deteriorate.

If a block size with relatively small horizontal and vertical sizes is used, although the matching point group may vary, the maximum and minimum disparities, which are the final outputs, may not change significantly.

If the ¼ reduced image is used, the time for calculation can be shortened, and less storage unit 150 space (e.g., memory space) is required for the calculation.

Figure 3:
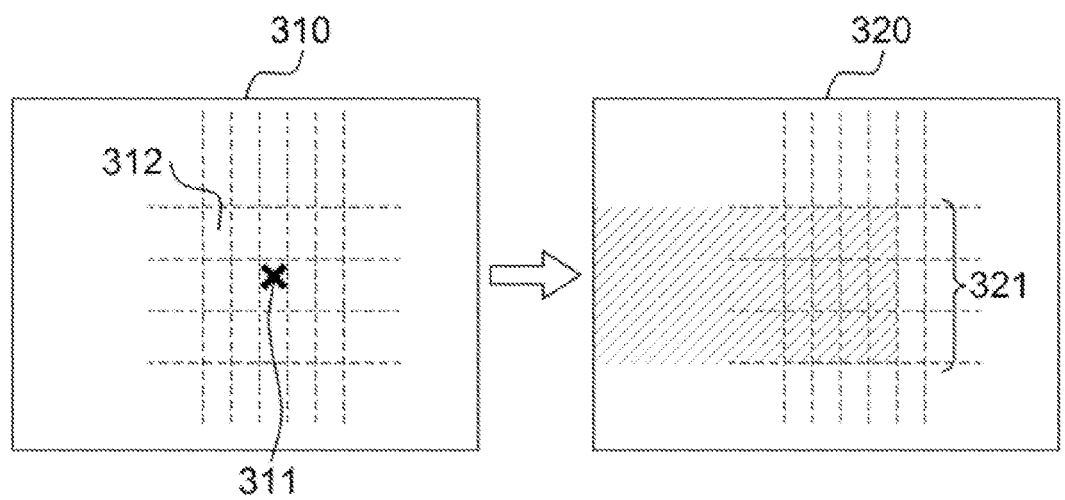
FIG. 3 illustrates a comparison of feature points of a left-eye image and a right-eye image, according to the present invention.

FIG. 3 illustrates a comparison of feature points of left- and right-eye images, according to the present invention.

Referring to FIG. 3, the feature point 311 of the left-eye image 310 is compared with the right-eye feature point 321 of the right-eye image 320.

That is, when the right-eye image and the matching points are searched with respect to the feature point within the left-eye image block 312, the search range of the right-eye image includes one line that contains the feature point of the right-eye image 320 corresponding to the left-eye feature point 311, and two additional lines which are upwardly and downwardly adjacent to the one line.

In order to verify the comparison between the left-eye feature point 311 and the right-eye feature range 321, the three spaces of the right-eye feature range 321 are compared with three lines of the left-eye image 310, respectively.

The three lines of the right-eye feature range 321 are compared with the left-eye feature point 311 in a manner in which each of the three lines is compared with one matching line and two lines upwardly and downwardly adjacent to the one matching line. Accordingly, the three lines of the right-eye feature range 321 are compared with a total of nine lines.

Figure 4:
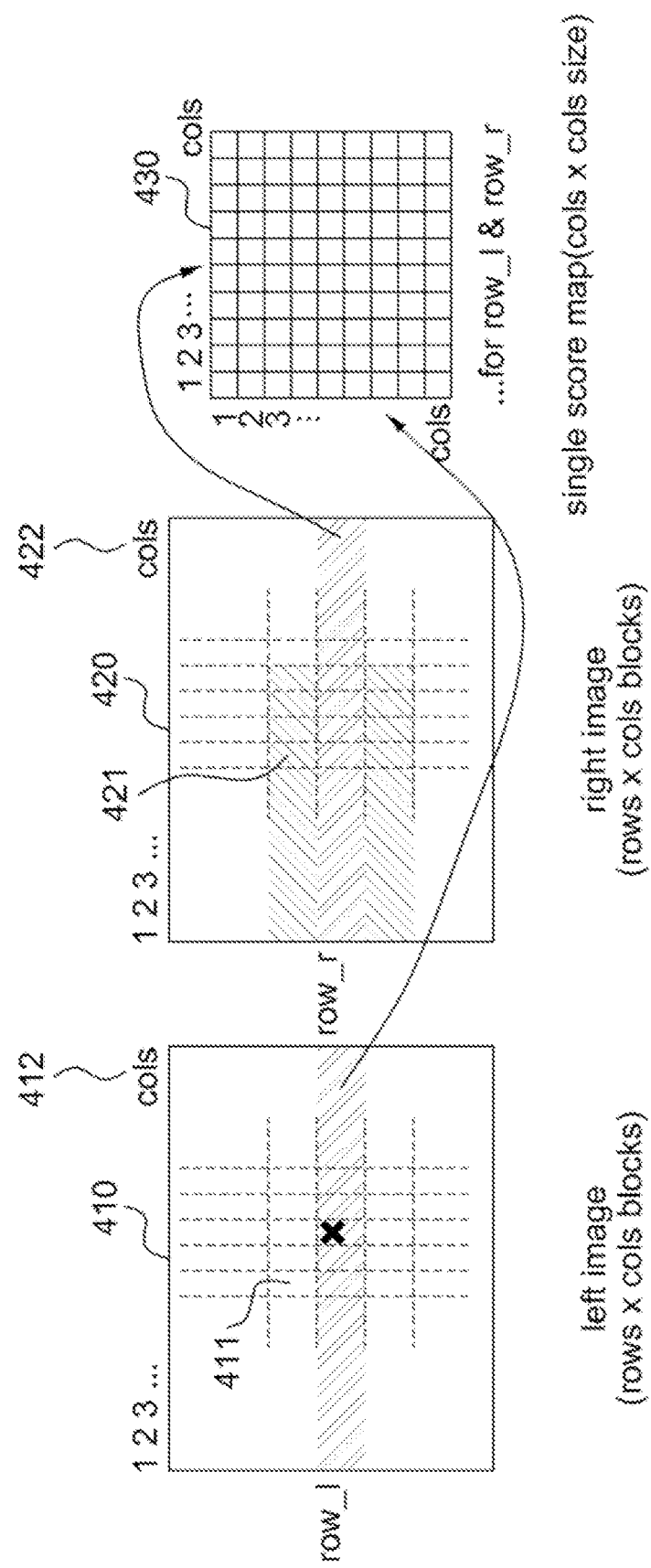
FIG. 4 illustrates a comparison of feature points of a left-eye image and a right-eye image represented on a single score map, according to the present invention.

FIG. 4 illustrates a comparison of feature points between left- and right-eye images on a single score map, according to the present invention.

Referring to FIG. 4, 'cols' 412 represents the number of horizontal blocks 411, 421 of the left- and right-eye images. Accordingly, a single score map 430 (a combination of horizontal left and right heights, such as, ⌈row_1 and row_r⌋ or ⌈row_and row_r+1⌋) has a size of cols 412×cols 422. However, in actual implementation, the cols 412×cols 422 are not entirely used since the left- and right-eye lens units 120, 130 are parallel to each other. Approximately 30% of cols 412×cols 422 may not be used.

It is possible to reduce space of the storage unit 150 used for the calculation, and also omit unnecessary calculation loops using the single score map 430, to more efficiently process the feature point matching.

If the block size 411, 422 is changed, the number and density of corners change. However, the density of the corner can affect the single score map 430 processing in a two-fold manner.

That is, if the block size 411, 421 is doubled in the horizontal direction, the cols 412, 421 is ½ reduced, and as a result, the space of the storage unit 150 used and the calculation amount are reduced to ¼.

Accordingly, the time for the calculation or the space of the storage unit 150 used for the calculation can be adjusted by adjusting the block size 411, 421 of the left- and right-eye images.

The matching technology of the extracted feature points will be described below.

After the feature points of the left- and right-eye image are extracted, relationship of the matching points between the left- and right-eye images are calculated. To this end, within an area of a size including the feature points of the left- and right-eye images, the feature points of the left- and right-eye images existing in the area are compared with each other.

Based on the extracted feature points, misalignment between the left- and right-eye images can be corrected.

Various matching methods may be adequately implemented. However, a relatively simple method may be selected for fast calculation. The methods such as Sum of Absolute Difference (SAD), Sum of Squared Difference (SSD), or Zero Normalized Cross Correlation (ZNCC) are generally considered as simple methods.

In one embodiment, SSD is implemented.

As one of the matching method, the SSD represent the matching accuracy of the feature points of the left- and right-eye images. SSD is defined by the sum of the square differences of the feature points of the area of the predetermined size including the feature points of the left- and right-eye images.

Post-processing is implemented after the matching.

In the post-processing, the accuracy of feature point matching may be increased by performing a consistency test, a single optimum point test, and a test of continuity of the estimated disparities, thereby removing incorrect matching.

The 'consistency test' removes the matching results that fail to meet the one-to-one basis between the feature points extracted from the left-eye and right-eye images, respectively.

The 'single optimum point test' removes rather obscure matching results when there is a plurality of matching points existing with respect to one matching point.

The 'test of continuity of the estimated disparities' removes matching error based on an assumption that the adjacent feature points have similar disparity values.

The disparity values of the feature points of the left- and right-eye images may be calculated through feature point matching. Based on the reliability of the matching points obtained from the feature point matching of the left- and right-eye images, an accumulated histogram between reliability-disparity value may be generated and the minimum and maximum disparity values may be calculated using the same.

The reliability of the matching points may be defined based on the values of the matching cost function.

After the accumulated histogram is generated, the value of the accumulated histogram is normalized to between 0 and 1. By using the values of the accumulated histogram, but excluding the disparity values within 0.02 and disparity values beyond 0.98, the minimum and maximum disparity values can be calculated. The lower and upper bounds of 0.02 and 0.98 of the accumulated histogram may vary depending on the degree of disparity.

Disparity values exist between the feature points of the left- and right-eye images in the AF area. The average of the disparity values, or one of the median values is set to be the disparity value of the AF area.

If the number of feature points within the AF area is below a predetermined value, the displacement value may not be calculated.

Figure 5:
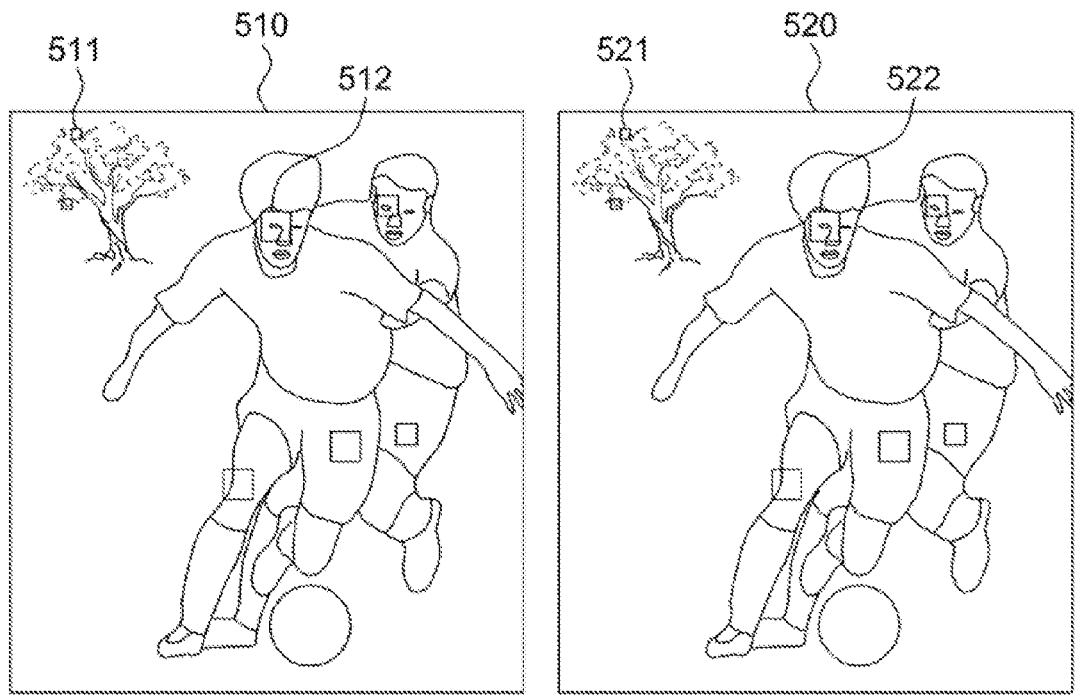
FIG. 5 illustrates an evaluation of a matching point, according to the present invention.

FIG. 5 illustrates an evaluation of the matching point, according to the present invention.

The method for evaluating the matching point will be explained below.

A mask 511, 521 may be used to locate a matching point of the left- and right-eye images 510, 520. The mask 511, 521 selects an area of the left- and right-eye images 510, 520, and according to the evaluation method of the matching point, the feature points of the left- and right-eye images within the mask area are compared with each other.

The mask 511, 521 may have a small size if the mask 511, 521 is applied to an object located relatively far away from the left- and right-eye images 510, 520, while the mask 511, 521 may have a large size if the mask 511, 521 is applied to an object located relatively close to the images.

If a large-size mask 511, 521 is applied to an object at a far distance, due to relatively smaller size of the object, the number of feature point comparisons between the left- and right-eye images 510, 520 may increase.

If a small-size mask 511, 521 is applied to an object in the proximity, due to a relatively larger size of the object, the object may exceeds the mask 512, 521, and accordingly, error may occur particularly when comparing the feature points between the left- and right-eye images 510, 520.

Disparity dd may be calculated from the disparity dconv of a specific object existing on a point at which the maximum disparity dmax, minimum disparity dmin, and convergence point are to be aligned in the left- and right-eye images 510, 520, based on Equation 3 below.

The pre-determined disparity dref refers to the disparity that provides less visual fatigue and greater 3D effect when the left- and right-eye images 510, 520 are overlain on each other to construct a 3D image.

A target ICD (ICDtarget), which is the distance between the left- and right-eye lens units 120, 130 may also be determined by Equation (4), if the disparity dd is calculated by Equation (3):

$$\max\{(d\mathrm{max}-d\mathrm{conv}),(d\mathrm{conv}-d\mathrm{min})\}=dd \quad (3)$$

$$\mathrm{ICDtarget}=\mathrm{ICDcurrent}\times d\mathrm{ref}/dd \quad (4)$$

The current ICD (ICDcurrent) represents a distance between the left- and right-eye lens units 120, 130 before being adjusted to ICDtarget.

The ICD 240 may be adjusted so that the disparity dd calculated by formula 3 can be adjusted close to the already-determined disparity dref.

The processing unit 140 processes the real-time inputted left- and right-eye images 510, 520, and adjusts, in real-time, the actuator 170 to satisfy the optimum ICDtarget on virtually a real-time basis.

Since the processing unit 140 generally has noise, dmax, dmin, dconv, or accumulated histogram may vary even with respect to the same scene. If the noise is present, the processing unit 140 may use previously-calculated max, dmin, or dconv for a period of time.

By way of example, the processing unit may use the previously-calculated values, using the average value, mode, or temporal consistency of the processed disparities.

The 'temporal consistency' uses correlation among the previous several frames to determine ICDtarget. If variation of dd is generally low in the previous several frames, but rapidly changes in one or two frames, such is considered to be a result of noise rather than the change of a scene. Accordingly, the ICDtarget may not be moved.

The noise influence depends heavily on illumination (radiation) intensity. The noise influence may be minor during the day or in an outdoor setting where the intensity of illumination is high, but increases to cause an error in the left- and right-eye images at night or in an indoor setting where the illumination intensity is low.

Using the illumination information acquired through the 3D photographing apparatus 100, the ICDtarget is calculated using a few previous frames when the intensity of illumination is high, while the ICDtarget is calculated using many previous frames when the intensity of illumination is low.

Using many frames may reduce noise influence, but can lead to increased use of computational capability and electricity. Accordingly, a few frames may be used when the intensity of illumination is high.

Since power consumption increases as the actuator 170 is continuously driven, the actuator 170 may be selectively driven on specific occasions, such as when the viewer changes zoom or presses the shutter, to signal his/her intention to capture left- and right-eye images 510, 520 to the 3D photographing apparatus 100.

The distance between the left- and right-eye lens units 120, 130 has to be adjusted in a short time.

As explained above with reference to FIGS. 1-2 and 5, the processing unit 140 calculates the disparity, adjusts the distance between the left- and right lens units 120, 130 and captures the left- and right-eye images 510, 520. In this process, if the ICD 240 is adjusted at a slow speed, the left- and right-eye images 510, 520 may change.

The viewer of the 3D image combining the left- and right-eye images may determine the time for adjusting the ICD 240, i.e., the time for adjusting the distance between the left- and right-eye lens units 120, 130.

The adjusting time may be set previously or as the viewer wishes. In order to implement real-time realization of 3D images, the previously-set adjusting time may be one second or less.

Figure 6:
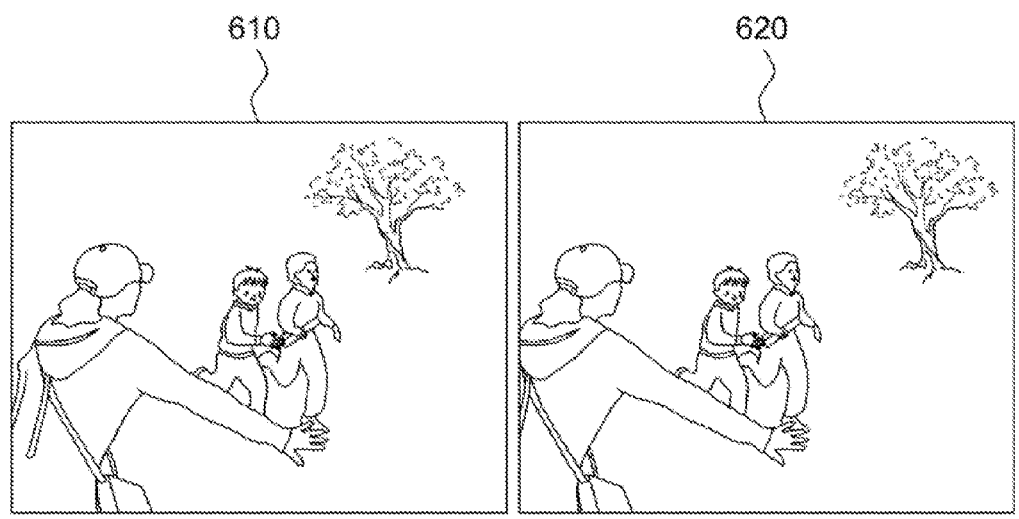
FIG. 6 illustrates a left-eye image and a right-eye image photographed through a 3D photographing apparatus, according to the present invention.

FIG. 6 illustrates an example of left- and right-eye images captured through the 3D photographing apparatus 100 shown in FIG. 1, according to the present invention.

Referring to FIG. 6, the left- and right-eye images 610, 620 are photographed by the 3D photographing apparatus 100, which has 77 mm of ICD 240, i.e., the distance between the left- and right-eye lens units 120, 130.

The left- and right-eye images 610, 620 are photographed with the resolution VGA (640×480), respectively.

Figure 7:
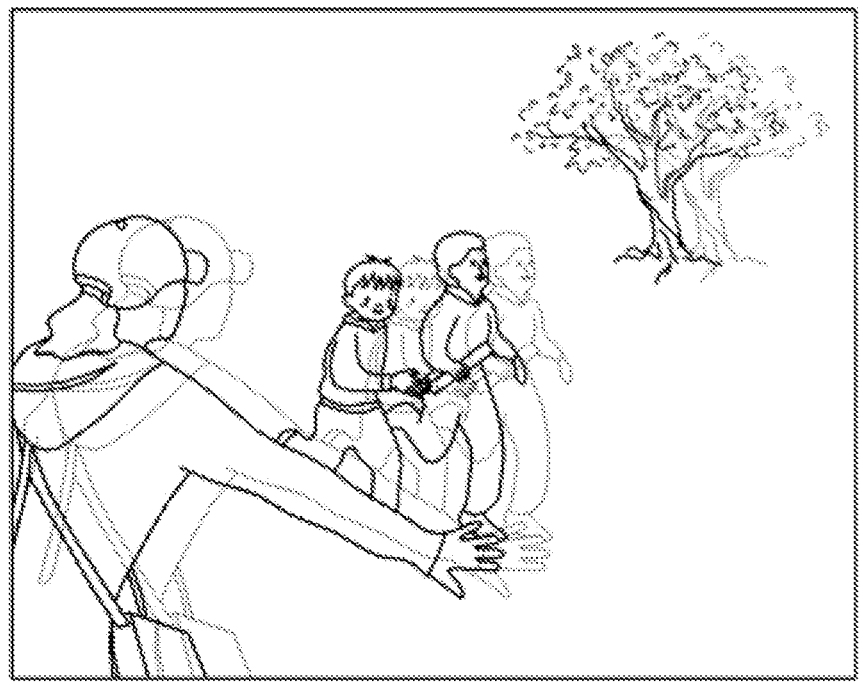
FIG. 7 illustrates a 3D image constructed as the overlain left-eye and right-eye images in FIG. 6, according to the present invention.

FIG. 7 illustrates an example of a 3D image rendered by overlaying the left- and right-eye images 610, 620 in FIG. 6, according to the present invention.

Referring to FIG. 7, the processing unit 140 shown in FIG. 1 geometrically adjusts the left- and right-eye images 610, 620, and overlays the left- and right-eye images 610, 620 on each other to construct a 3D image.

Figure 8:
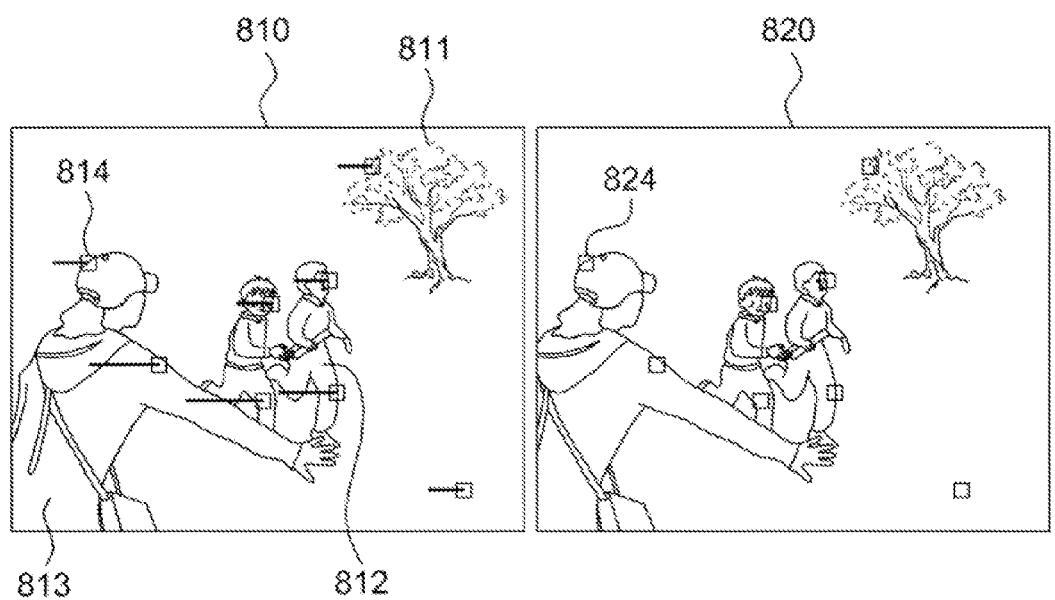
FIG. 8 illustrates the feature points of the left-eye and right-eye images in FIG. 6, according to the present invention.

FIG. 8 illustrates an example of a comparison of feature points extracted from the left- and right-eye images, according to the present invention.

Referring to FIG. 8, the processing unit 140 shown in FIG. 1 calculates the maximum disparity and minimum disparity of the left- and right-eye images 810, 820, and disparity of a specific object within the AF area and shows the feature point 814 of the left-eye image and the feature point 824 of the right-eye image 820.

The left-eye image 810 shows the feature points matching the feature points of the right-eye image 820, and disparities between the feature points 814, 824 between the left- and right-eye images by line marks.

The length of each line represents the disparity size of the feature points 814, 824 between the left- and right-eye images.

The left-eye image 810 shows a relatively longer line mark, which represents the mismatching of the feature points 814, 824 of the left- and right-eye images.

The mismatched feature points may be removed using the histogram, and then the maximum and minimum disparities may be calculated.

Figure 9:
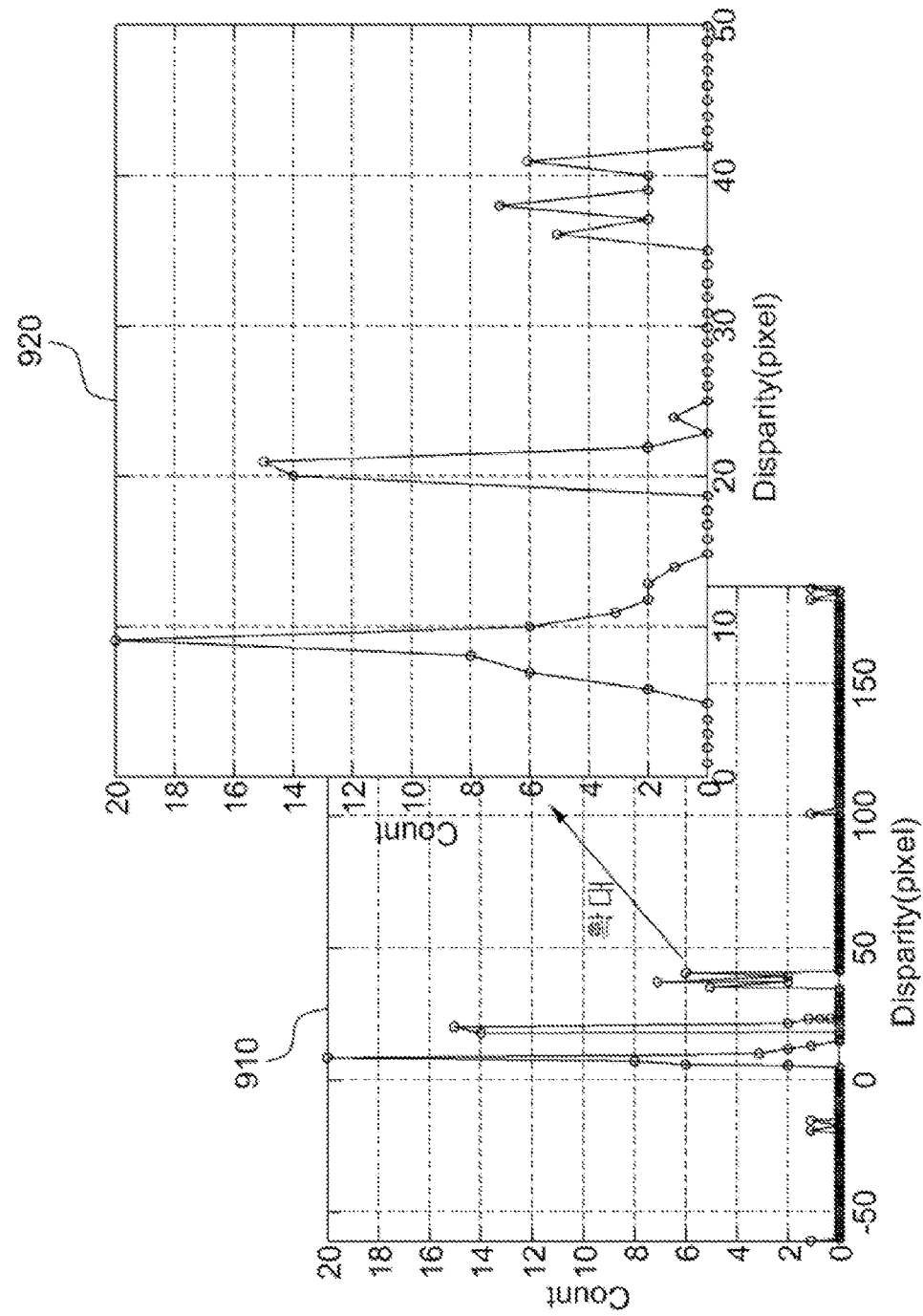
FIG. 9 is a histogram illustrating feature points extracted from the left-eye and right-eye images in FIG. 8, according to the present invention.

FIG. 9 illustrates disparities of the feature points extracted from the left- and right-eye images in FIG. 8, according to the present invention.

Referring to FIG. 9, i.e., in graph 910 and an enlarged graph 920, disparity peaks are present near about 10 pixels, 20 pixels and 38 pixels. The proximity to about 10 pixels corresponds to the disparity of the background 811 (FIG. 8), the proximity to about 20 pixels corresponds to the disparity of an object 812 located at the center, and the proximity to about 38 pixels corresponds to the disparity of an object 813 located therebelow on a left side.

If a confidence interval of 0.98 is selected from the histogram of FIG. 9, the minimum disparity (dmin) is 6 pixels, and the maximum disparity (dmax) is 41 pixels.

Based on the histogram of FIG. 9, disparities other than the minimum disparity (6 pixels) and the maximum disparity (41 pixels) may be determined to be mismatching.

The disparity of the specific object may be an object within the AF area, or a perceived person if facial recognition is employed.

Referring to FIG. 8, if the AF area is center, the object 812 will be the specific object. Accordingly, the disparity of the specific object is approximately 20 pixels (=dconv).

If the AF area is left-lower portion, the object 813 will be the specific object. Accordingly, the disparity of the specific object is approximately 38 pixels.

By way of example, if a viewer watches a 50-inch, FullHD (1920×1080) 3D TV at a two meter distance from the TV, it is assumed that the limit (or reference) of the visual fatigue is 36 pixels.

The '36 pixels' herein refers to an example where the object on the display has a disparity of 0, and the viewer perceives the 3D images with good quality, i.e., without experiencing visual fatigue, as long as the object protrudes from or sinks into the display as much as 36 pixels of disparity.

Since the 3D image is a VGA image, it is 12 pixels (=dref), which is ⅓ of FullHD.

Referring again to FIG. 8, if convergence is made on the specific object 812, the disparity of the object 813 (i.e., maximum disparity, dmax) is 41−20=21 pixels, and the background disparity (i.e., minimum disparity, dmin) is 20−6=14 pixels.

Substituting the maximum and minimum disparities, and disparity of the specific object are substituted in Equations (3) and (4), yielding the following expressions, which will be called Equation (5):

$$\max\{(41-20),(20-6)\}=21 \text{ pixels}$$

$$\text{ICDtarget}=77*12/21=44 \text{ mm} \quad (5)$$

If the distance between the left- and right-eye lens units 120, 130 is moved to 44 mm, based on Equation (5), the disparity of the object 813 (i.e., maximum disparity, 21 (=41−20)) will become 12 pixels (21×44/77), disparity of the specific object 812 (0(=20−20)) becomes 0 pixel (0×44/77), and the disparity of the background (−14(=6−20)) is −8 pixels (−14×44/77).

Since the specific object 812 appears on the display, while the object 813 protrudes from the display and the background sinks into the display, the 3D image, combining the left- and right-eye images, can yield a high quality 3D effect without giving visual fatigue.

Figure 10:
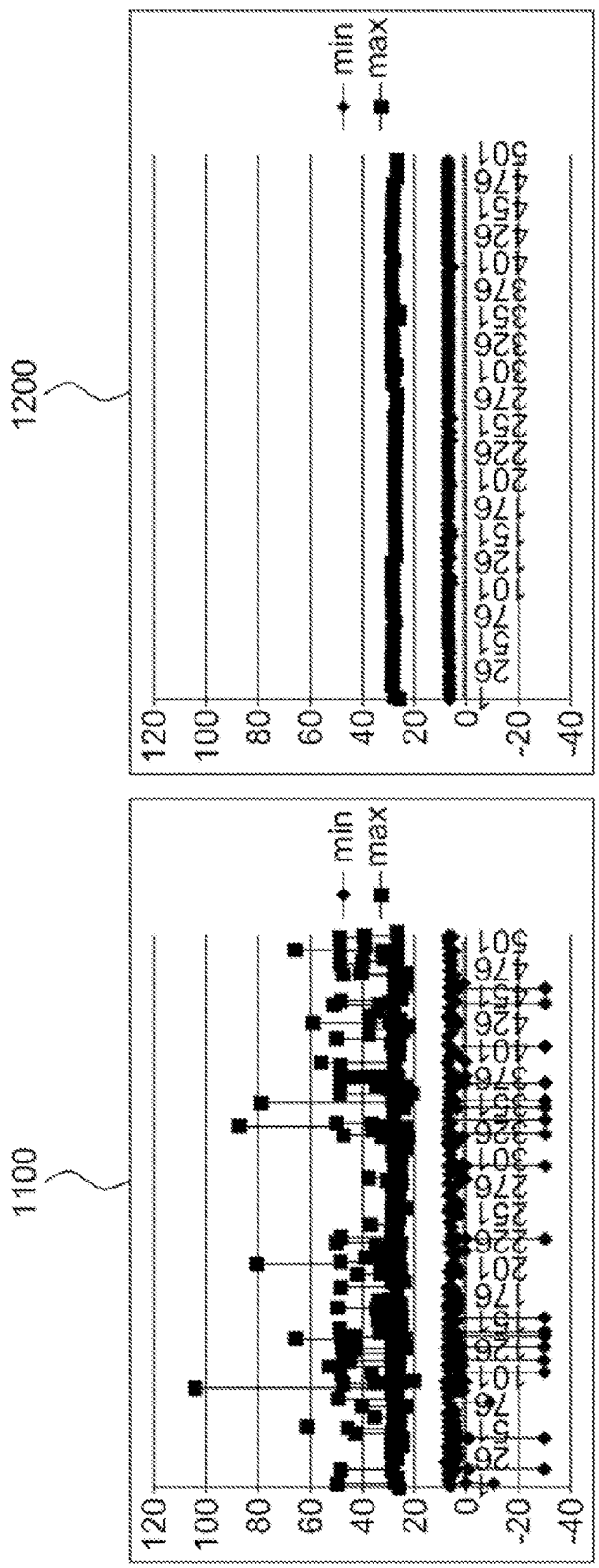
FIG. 10 illustrates disparities of the feature points extracted from the left-eye and right-eye images in FIG. 9, according to the present invention.

FIG. 10 illustrates disparities of the feature points extracted from the left- and right-eye images in FIG. 9.

Referring to FIG. 10, graph 1100 represents an example in which noise is present due to a miscalculation made while finding matching points between left- and right-eye images 810, 820 or poor intensity of illumination.

If the temporal consistency using the previous frame is applied to the graph 1100, a noise-free graph 1200 can be obtained. Accordingly, effective maximum and minimum disparities can be obtained from the graph 1200, and the distance between the left- and right-eye lens units 120, 130 can be adjusted more effectively.

The present invention may be implemented as program commands that can be executed through various computing means, and also recorded in computer-readable media. The computer-readable media may include program commands, data files, or data structure individually, or in combination. The program commands recorded in the media may be specifically designed and constructed for the present invention, or available to those skilled in the art in the field of computer software.

The foregoing embodiments and advantages are not to be construed as limiting the present invention. The present teaching can be readily applied to other types of apparatuses. Also, the description of embodiments of the present invention is intended to be illustrative, and not to limit the scope of the claims, and many alternatives, modifications, and variations will be apparent to those skilled in the art.

What is claimed is:

1. A method for controlling a three dimensional (3D) photographing apparatus, the method comprising:
   acquiring a feature point of a left-eye image entering through a left-eye lens, and a feature point of a right-eye image entering through a right-eye lens;
   detecting a disparity between the left- and right-eye images by comparing the feature points of the left- and right-eye images;
   controlling a distance between the left- and right-eye lenses so that the disparity between the left- and right-eye images becomes a previously-set reference disparity; and
   shifting at least one of the left- and right-eye images so that a convergence point is placed on a first object located within the left- and right-eye images,
   wherein the detecting comprises:
   determining a number of frames of a previous left-eye image or a previous right-eye image based on an intensity of illumination of the left- or right-eye image; and
   determining a consistency of disparity between the left- and right-eye images using the frames of the previous left- or right-eye images.

2. The method of claim 1, wherein the specific object exists in an auto-focus area, and the shifting includes shifting at least one of the left- and right-eye images so that a disparity is at a minimum between the feature points existing in the left- and right-eye images with respect to the first object.

3. The method of claim 1, wherein the controlling includes moving at least one of the left- and right-eye lenses in a substantially perpendicular direction with respect to an optical axis.

4. The method of claim 3, wherein the moving includes moving at least one of the left- and right-eye lenses within a previously-set maximum time.

5. The method of claim 1, wherein if the disparity of the first object is at the minimum, at least a second object has a negative disparity, and at least a third object has a positive disparity.

6. The method of claim 5, wherein, with reference to the left- and right-eye lenses, the at least a second object is located in front of the first object, and the at least a third object is located in back of the first object, or the at least a second object is located in back of the first object, and the at least a third object is located in front of the first object.

7. The method of claim 1, wherein the controlling includes comparing the disparity between the left- and right-eye images with a previously-set reference disparity so that the disparity between the left- and right-eye images becomes the previously-set reference disparity, and the previously-set reference disparity (dref) is defined by:

$$\max\{(d\text{max}-d\text{conv}),(d\text{conv}-d\text{min})\}\approx d\text{ref}$$

where, dmax is a maximum disparity, dmin is a minimum disparity, and dconv is a disparity of the first object.

8. The method of claim 1, wherein the detecting includes detecting the disparity between the left- and right-eye images using an accumulated histogram with respect to a plurality of disparities between the left- and right-eye images.

9. The method of claim 7, wherein the previously-set reference disparity (dref) is a value between 30 and 40 minutes,
   the previously-set reference disparity is a difference of convergence angles between when a lens is focused on a plane of a screen and when the lens is defocused on the plane of the screen, and
   the convergence angle represents an angle between the lenses when the left- and right-eye lenses are focused on the first object.

10. The method of claim 1, wherein the determining includes reducing the number of frames of the previous left- or right-eye image when the intensity of illumination is high, and increases the number of frames of the previous left- or right-eye image when the intensity of illumination is low.

11. A three dimensional (3D) photographing apparatus, comprising:
   an acquiring unit which acquires a feature point of a left-eye image entering through a left-eye lens, and a feature point of a right-eye image entering through a right-eye lens;
   a detecting unit which detects a disparity between the left- and right-eye images by comparing the feature points of the left- and right-eye images;
   a control unit which controls a distance between the left- and right-eye lenses so that the disparity between the left- and right-eye images becomes a previously-set reference disparity, and shifts at least one of the left- and right-eye images so that a convergence point is placed on a first object located within the left- and right-eye images,
   wherein the control unit compares the disparity between the left- and right-eye images with a previously-set reference disparity so that the disparity between the left- and right-eye images becomes the previously-set reference disparity, and
   the previously-set reference disparity (dref) is defined by:

$$\max\{(d\text{max}-d\text{conv}),(d\text{conv}-d\text{min})\}\approx d\text{ref}$$

where, dmax is a maximum disparity, dmin is a minimum disparity, and dconv is a disparity of the object.

12. The 3D photographing apparatus of claim 11, wherein the specific object exists in an auto-focus area, and the control unit shifts at least one of the left- and right-eye images so that a disparity is at a minimum between the feature points existing in the left- and right-eye images with respect to the object.

13. The 3D photographing apparatus of claim 11, wherein the control unit moves at least one of the left- and right-eye lenses in a substantially perpendicular direction with respect to an optical axis.

14. The 3D photographing apparatus of claim 13, wherein the control unit moves at least one of the left- and right-eye lenses within a previously-set maximum time.

15. The 3D photographing apparatus of claim 11, wherein the previously-set reference disparity (dref) is a value between 30 and 40 minutes, the previously-set reference disparity is a difference of convergence angles between when a lens is focused on a plane of a screen and when the lens is defocused on the plane of the screen, and the convergence angle represents an angle between the lenses when the left- and right-eye lenses are focused on the object.

16. The 3D photographing apparatus of claim 11, wherein an indicator is provided to indicate degree of visual fatigue according to the disparity, and the 3D photographing apparatus further comprises a display unit which displays a recommendation according to the indicator.

17. A non-transitory computer-readable recording medium having recorded thereon a computer program for executing a method of controlling a three dimensional (3D) photographing apparatus, the method comprising:

acquiring a feature point of a left-eye image entering through a left-eye lens, and a feature point of a right-eye image entering through a right-eye lens;

detecting a disparity between the left- and right-eye images by comparing the feature points of the left- and right-eye images;

controlling a distance between the left- and right-eye lenses so that the disparity between the left- and right-eye images becomes a previously-set reference disparity; and shifting at least one of the left- and right-eye images so that a convergence point is placed on a first object located within the left- and right-eye images wherein the detecting comprises:

determining a number of frames of a previous left-eye image or a previous right-eye image based on an intensity of illumination of the left- or right-eye image; and determining a consistency of disparity between the left- and right-eye images using the frames of the previous left- or right-eye images.

* * * * *